(12) United States Patent
Lo

(10) Patent No.: US 9,845,255 B2
(45) Date of Patent: Dec. 19, 2017

(54) SYSTEM FOR DECOMPOSITION OF ORGANIC COMPOUNDS AND METHOD OF OPERATION

(76) Inventor: Kwok Ki Lo, Hong Kong (CN)

( * ) Notice: Subject to any disclaimer, the term of this patent is extended or adjusted under 35 U.S.C. 154(b) by 0 days.

(21) Appl. No.: 14/232,458

(22) PCT Filed: Jul. 10, 2012

(86) PCT No.: PCT/CN2012/078406
§ 371 (c)(1),
(2), (4) Date: Jun. 24, 2014

(87) PCT Pub. No.: WO2013/007183
PCT Pub. Date: Jan. 17, 2013

(65) Prior Publication Data
US 2014/0305866 A1    Oct. 16, 2014

(30) Foreign Application Priority Data

Jul. 14, 2011    (GB) .................................. 1112102.7

(51) Int. Cl.
*A01K 61/59*    (2017.01)
*A01K 63/04*    (2006.01)
(Continued)

(52) U.S. Cl.
CPC ................ *C02F 3/02* (2013.01); *C02F 3/322* (2013.01); *C02F 3/327* (2013.01); *C02F 7/00* (2013.01);
(Continued)

(58) Field of Classification Search
CPC .... C02F 3/32; C02F 3/322; C02F 1/74; C02F 1/78; C02F 2305/06; C02F 3/327;
(Continued)

(56) References Cited

U.S. PATENT DOCUMENTS 4,995,980 A    2/1991    Jaubert
6,029,911 A *  2/2000    Watanabe ................ B01F 3/02
                                                                  210/760
(Continued)

FOREIGN PATENT DOCUMENTS

CN    1398795 A    8/2002
CN    1718548 A    1/2006
(Continued)

OTHER PUBLICATIONS

JPO translation of JP 2002018477 A from Japan Platform for Patent Information (J-PlatPat), dated Jul. 7, 2015.*
(Continued)

*Primary Examiner* — Lucas Stelling
(74) *Attorney, Agent, or Firm* — McCormick, Paulding & Huber LLP

(57) ABSTRACT

Disclosed an aerobic system for decomposition of aqueous organic waste, which comprises at least a first processing container including sides, an upper opening, a substantially horizontal floor, an inlet, an outlet, at least one channel arranged at the floor having an upwardly opening mouth, a ventilating pipe extending above the mouth, and a pump connected to the pipe and arranged to provide a supply of a gas to the ventilating pipe.

12 Claims, 2 Drawing Sheets

(51) Int. Cl.
*C02F 1/74* (2006.01)
*C02F 3/02* (2006.01)
*C02F 3/32* (2006.01)
*C02F 7/00* (2006.01)

(52) U.S. Cl.
CPC ............ *A01K 61/59* (2017.01); *A01K 63/042* (2013.01); *C02F 1/74* (2013.01); *C02F 2305/06* (2013.01); *Y02W 10/15* (2015.05); *Y02W 10/37* (2015.05)

(58) Field of Classification Search
CPC ........... C02F 3/345; C02F 7/00; Y02W 10/15; Y02W 10/37; A01K 61/59; A01K 63/042
See application file for complete search history.

(56) References Cited

U.S. PATENT DOCUMENTS

| | | | |
|---|---|---|---|
| 6,447,681 | B1 | 9/2002 | Carlberg et al. |
| 7,018,536 | B2 | 3/2006 | Couch |
| 2005/0126995 | A1 | 6/2005 | Couch |
| 2011/0151547 | A1 | 6/2011 | Bloch et al. |
| 2011/0174730 | A1* | 7/2011 | Chong et al. ................. 210/602 |

FOREIGN PATENT DOCUMENTS

| | | |
|---|---|---|
| CN | 1769204 A | 5/2006 |
| JP | 55073394 A | 11/1978 |
| JP | 2002018477 A | 5/2001 |

OTHER PUBLICATIONS

Definition of "pond", dictionary.com based on Random House Dictionary (Random House, Inc. 2015), accessed on Jul. 2, 2015.*
International Search Report for PCT/CN2012/078406 dated Sep. 4, 2012.
Office Action received in Priority Application GB1112102.7 dated Nov. 15, 2011.
Written Opinion for PCT/CN2012/078406 dated Oct. 18, 2012.

* cited by examiner

SYSTEM FOR DECOMPOSITION OF ORGANIC COMPOUNDS AND METHOD OF OPERATION

CROSS REFERENCE TO RELATED APPLICATIONS

This application is entitled to the benefit of and incorporates by reference subject matter disclosed in International Patent Application No. PCT/CN2012/078406 filed on Jul. 10, 2012 and United Kingdom Application No. 1112102.7 filed Jul. 14, 2011.

FIELD OF THE INVENTION

This invention relates to a system and a method for decomposition of organic compounds and in particular but not limited to conversion of organic waste products into foodstuffs for aquatic livestock aerobically and purifying waste water.

BACKGROUND OF THE INVENTION

Various methods have been used for processing of organic waste products. One conventional method that has been used in smaller farms is to contain organic waste products in a closed chamber in which the waste is allowed to decompose anaerobically. While this method can work to some extent, it has a rather low efficiency and it takes a long time to decompose a small amount of waste. Further, dangerous or pungent gases are released during such decomposition and severely affect the surrounding environment.

Another method of treating organic waste products is to use oxidative fermentation by using enzymes and/or artificial chemicals to decompose or react with organic compounds, for example, for treatment of waste water or livestock waste. Changing the pH of organic waste products has been used to allow separation by precipitation or dissolution. Changes in temperature have been used to change the properties of waste organic compounds by adjusting rates of reactivity or by altering properties such as viscosity, surface tension or solubility.

These known methods, including those commonly used in composting and biogas plant, due to the large size and considerable viscosity and electric charge of the organic matters, has a rather low efficiency. Various compositions of the organic waste products cause scum in an aquatic medium, and according to the present known methods, extracting the useful materials and controlling the biological flocculation are difficult in a large scale. Moreover, the composting and biogas plant require constant human monitoring and interruption. For example, artificial chemicals may be added to control the pH, biological oxygen demand (BOD) and chemical oxygen demand (COD). While adding artificial chemicals may improve the decomposition to some extent, using such chemicals is neither environment friendly nor desirable for water purified from using such methods for consumption.

The present invention aims at increasing the efficiency of decomposing organic waste products by providing an aerobic, suitable environment for phytoplankton and zooplankton (e.g. algae) and other microorganisms to decompose the organic waste products. This invention can further convert organic waste products into nutrients and provide suitable water for aquatic livestock, or at least to provide an alternative to the public.

SUMMARY OF THE INVENTION

According to a first aspect of the present invention, there is provided an aerobic system for decomposition of aqueous organic waste comprising (a) at least a first processing container including sides, the container having a capacity from 100 $m^3$ to 30,000 $m^3$ and provided with an upper opening with an area from 100 $m^2$ to 20,000 $m^2$, a substantially horizontal floor with an area from 100 $m^2$ to 10,000 $m^2$ and a depth from 1 m to 3 m, (b) an inlet for waste or waste water to be treated in the first processing container and an outlet for water treated in the first processing container, (c) at least one channel arranged at the floor having an upwardly opening mouth for collecting moulds, worms or worm-like living organisms, parasites and other sediments, the channel having a width less than 0.5 m and a depth from 0.5 m to 1 m, (d) a ventilating pipe extending above the mouth, the ventilating pipe having a multiplicity of apertures, and (e) a pump connected to the pipe and arranged to provide a supply of a gas comprising a mixture of compressed air with an additive selected from carbon dioxide, ammonia, sulphur dioxide, hydrogen sulphide, ozone and pure oxygen to the ventilating pipe to discharge a stream of air from the apertures into the water in use.

Preferably, the system is free of any precipitating agent supplied to the first processing container.

The system may further comprise a temperature and/or light adjustable cover for covering the container. The cover may comprise a material selected from the group consisting of: plastic sheet, laminated plastic, polyolefin film, translucent glass, toughened glass or laminated glass.

In a preferred embodiment, the system may be free from any artificial pH regulating agent, calcium oxide, calcium carbonate or ammonia carbonate added to the first processing container.

Preferably, the system may be supplied with a fertilizing agent such as hydrogen sulphide facilitating growth of phytoplankton or zooplankton (e.g. algae) in the water for decomposing waste in the water.

The first processing container may take the form of a pond, constructed with the sides and appropriate dimensions ad described above.

Suitably, the system may comprise a second processing container for collecting water treated in the first processing container and configured to allow growth of microorganisms feeding on phytoplankton or zooplankton in the water from the first processing container. The system may further comprise a third processing container for collecting water treated in the second processing container and configured to allow growth of fish and shrimps feeding on the microorganisms in the water from the second processing container.

There may or may not be an intermediate container between the second and third containers. It is thus to be understood that the system may comprise a series of at least three processing containers for successively treated water at different stages.

According to a second aspect of the present invention, there is provided a method of decomposition of aqueous organic waste aerobically comprising introducing waste or waste water into water in a first processing container as claimed in any preceding claim, allowing the waste water to circulate within the first processing container and providing an environment for growth of phytoplankton or zooplankton whereby the waste in the first processing container is decomposed naturally, allowing the algae containing water to pass successively into a second processing container and then a third processing container for generating purified water.

BRIEF DESCRIPTION OF DRAWINGS

Some embodiments of the present invention will now be explained, with reference to the accompanied drawings, in which.

DETAILED DESCRIPTION OF PREFERRED EMBODIMENT OF THE INVENTION

Ponds or reservoirs or other large scale water containers, referred to for simplicity in this specification as "containers", may be used in conjunction with bio-filters for water treatment processes. A principal consideration is that organisms in the bio-filters and the containers are not killed, e.g. by any toxic compounds or artificial chemicals contained in the waste water stream. However, it is difficult to control such a system to maintain a suitable environment for aquatic livestock and the organisms of the bio-filters without the bio-filters becoming infected with disease or pest organisms.

Figure 1:
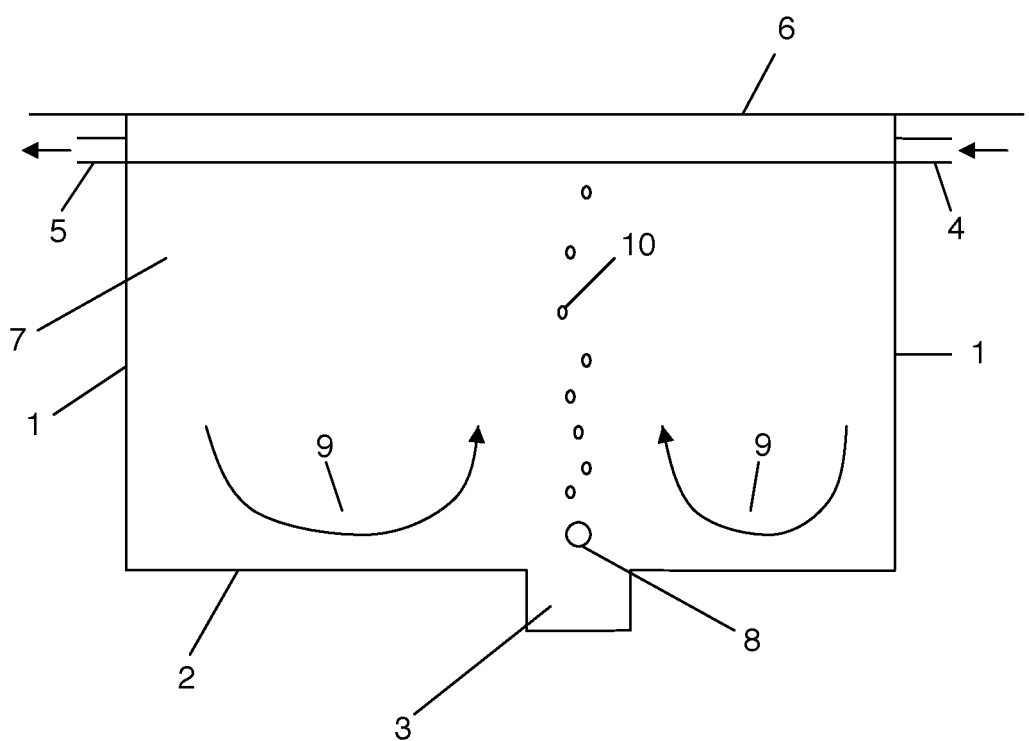
FIG. 1 is a schematic diagram showing a cross section of a processing container for treating waste water.

FIG. 1 is a schematic diagram illustrating a first processing container 1 of an embodiment of a water purifying system of the present invention. The first processing container takes the form of a pond 1. The pond 1 has generally vertical sides with an opening and a floor 2. In this embodiment, the pond 1 has a capacity of 5,000 m$^3$; the opening and/or the floor 2 have a size or area of about 100 m$^2$; and has a depth of about 1 m. Studies in the course of this invention have identified that the capacity may actually range from 100 m$^3$ to 30,000 m$^3$ The size or area of the opening or floor 2 may range from 100 m$^2$ to 10,000 m$^2$, and the depth may range from 1 m to 3 m. The studies have found that if the dimensions do not fall within these ranges, control of the container 1 would become difficult or working of the container 1 would not be reliable.

The pond 1 is provided with a channel 3 that extends between opposed sides of the floor 2 of the pond 1. The channel 3 has an upwardly opening mouth for collecting moulds, worms or worm-like living organisms, parasites and other sediments. In this embodiment, the channel 3 has a width of about 0.25 m and a depth of about 0.75 m. Studies have shown that the channel 3 may be embodied in such a way that it extends longitudinally of the pond 1, for example along the longitudinal axis of a rectangular or elongate pond. Further, the channel 3 may have a width of less than 0.5 m and a depth from 0.3 m to 1 m. These particular ranges are advantageous. If the width or the depth of the channel 3 were too great access to material or waste deposited in the channel 3 would be difficult and efficiency of decomposition would be hindered. If the decomposition rate were too low continual accumulation of the materials or waste in the channel 3 would clog the channel 3 and disrupt working of the channel 3 and lead to failure of the first processing container 1. The channel 3 may have any convenient shape but is preferably rectangular in cross section for ease of cleaning and maintenance.

In other embodiments, more than one channel maybe provided, especially when the pond has a wider floor.

The pond 1 is also provided with a ventilating pipe 8 with apertures located above the mouth of the channel 3 for releasing gas bubbles 10. In this embodiment, the pipe 8 extends above the channel 3 along the length of the channel 3. The pipe 8 is provided with a multiplicity of apertures.

It is however to be understood that in other embodiments a plurality of such pipes may be provided in order to increase the supply of air or oxygen to the water in the pond. Depending on the depth or width of the pond, the pipes may be arranged accordingly. For example, if the pond has a greater width, multiple pipes may be distributed above the channel(s). The ventilating pipe may be mounted on a series of supports extending from the floor of the pond, for example stakes driven into the ground. Alternatively the supports may comprise cross members extending across the channel. The ventilating pipe may have a diameter of 25 mm, 32 mm or 40 mm as may be available on the market.

The diameter of the apertures of the pipe 8 may be in the range of 0.5 mm to 1.5 mm. Use of smaller apertures is not preferred since small bubbles generated may not cause sufficient turbulence to break up solid particles. Use of larger apertures is not preferred since large bubbles may not result in efficient water circulation.

The pond 1 is provided with a pump (not shown) connected to the pipe 8 and arranged to provide a supply of a gas comprising a mixture of compressed air with gas to the ventilating pipe 8 to discharge a stream of air from the apertures into the water 7 in use. Release of a continuous stream of the bubbles 10 into the bottom of the pond 1 above the channel 3 causes circulation of water as the bubbles rise towards the surface of the water. The gases may be pressurized in order to increase the solubility of the gases and mixtures. A compressor and mixing head 11 allow a mixture of air and carbon dioxide, ammonia, sulphur dioxide or hydrogen sulphide and warm water to be pumped into the ventilating pipe 8. The gas comprises a mixture of air with one or more gases selected from carbon dioxide, ammonia, sulphur dioxide, hydrogen sulphide, ozone and pure oxygen. The gas, if represented by its components, may have a carbon to nitrogen ratio of 5:1 to 10:1 by volume. The addition of other components such as sulphur will depend on the condition of the pond water.

Movement of the water caused by rising bubbles creates a current within the body of water causing separation of waste materials which have been added to the pond, preventing them from settling in a solid mass. The current is illustrated by the arrows 9 in FIG. 1. Formation of solid masses is undesirable since these would reduce the rate of processing and may cause chemical reduction to take place. As the water circulates in the pond 1 larger clumps of material break up into smaller clumps due to collisions and a decrease of the stability of the organic waste products. Also, water is drawn across the floor of the pond and rises with the stream of bubbles. The circulation of water also causes dispersion of micro organisms and organic matter increasing the surface contact area and speeding up the decomposition reactions. Smaller clumps formed may be digested by the microorganisms immediately. Studies show that this particular approach and system has a higher efficiency than present known methods.

Organic matter that is heavier than water moves to the bottom of the pond 1 and is circulated into the channel 3 by the flow of water caused by rising air bubbles. The matter which accumulates in the channel may include eggs or larvae of parasites and worms. Matter that has sunk into the channel 3 is prevented from circulation because there is no or much less water circulation in the channel. A lack of oxygen in the channel 3 may prevent or at least minimize hatching of worm eggs and/or development of other parasites. Decomposing matter may become lighter due to bacterial action, permitting circulation within the pond to facilitate decomposition.

The rate of flow of gas from the apertures is controlled by a control mechanism responsive to one or more sensors. The rate of flow and the quantity and ratio of the gases supplied may be changed using an automatic control mechanism responsive to continuously monitored changes in the environment.

The mixtures of gas may provide nutrients for autotrophic or heterotrophic bacteria. The pH of the water may be controlled by addition of natural acidic or basic gases e.g. sulphur dioxide or ammonia to the mixture as appropriate if needed. However, when carefully constructed additional of external artificial agents would not be needed.

In other embodiments, additional inlets for gases may be provided. These may comprise pipes carrying exhaust gas from domestic or industrial power utilities which are rich in carbon dioxide.

As it can be understood, the function of supplying gases through the pipe 8 is at least two-folded. First, the gases provide a source of oxygen which allows growth of waste decomposing algae in the pond. Second, the gases released from the pipe 8 generate mild currents in the water contained in the pond. The channel 3 and the generation of current 9 work together in a synchronized manner. Specifically, wastes or at least heavier wastes in the water in the pond 1 tend to settle in the channel 3. Since the wastes are organically based, the channel 3 containing the wastes provides a shelter for collecting the wastes. After the (or some of the) wastes are collected in the channel, water at an upper level of the pond becomes clearer and this leads to water exiting the pond being clearer. Further, the sheltered condition of the channel 3 prevents or at least reduces hatching of eggs from parasites. Without the channel 3, the wastes would be suspended in the water and deprive oxygen from the water and hinder growth of aerobic microorganisms such as algae to grow in the water and to decompose the wastes. The supply of gases creates mild currents to bring a constant small amount of nutrients from the wastes in the channel 3 throughout the water in the pond 1. The pipe 8 thus provides not just oxygen which is essential to growth of aerobic microorganisms in the water, but also a suitable amount of flow in the water for nutrient distribution.

The pond 1 is also provided with an inlet 4 for receiving waste or waste water and an outlet 5 for discharging water treated in the first processing container 1.

One characteristic of the first processing container 1 in the water purification system of the present invention is that no precipitating agent is supplied to the first processing container. This is advantageous in a number of ways. First, the use of artificial precipitating agents departs from the principle of purifying water naturally. Second, the artificial precipitating agents would or at least could hinder growth of phytoplankton and zooplankton in the water. Since phytoplankton and zooplankton are essential for the working of the water purifying pond, the use of such agents would be counterproductive. Third, when external precipitating agents are used constant human control or monitoring the precipitating conditions in the water would be needed. This is neither desirable nor cost effective. Further, the agents are likely to be carried over to the water exiting the pond 1. Further remedies would be needed to treat such treated water.

Studies have shown that warm water may be provided at the bottom of the pool 1 in order to facilitate the water circulation within the pool 1, further facilitating the breaking down of organic waste products.

Figure 2:
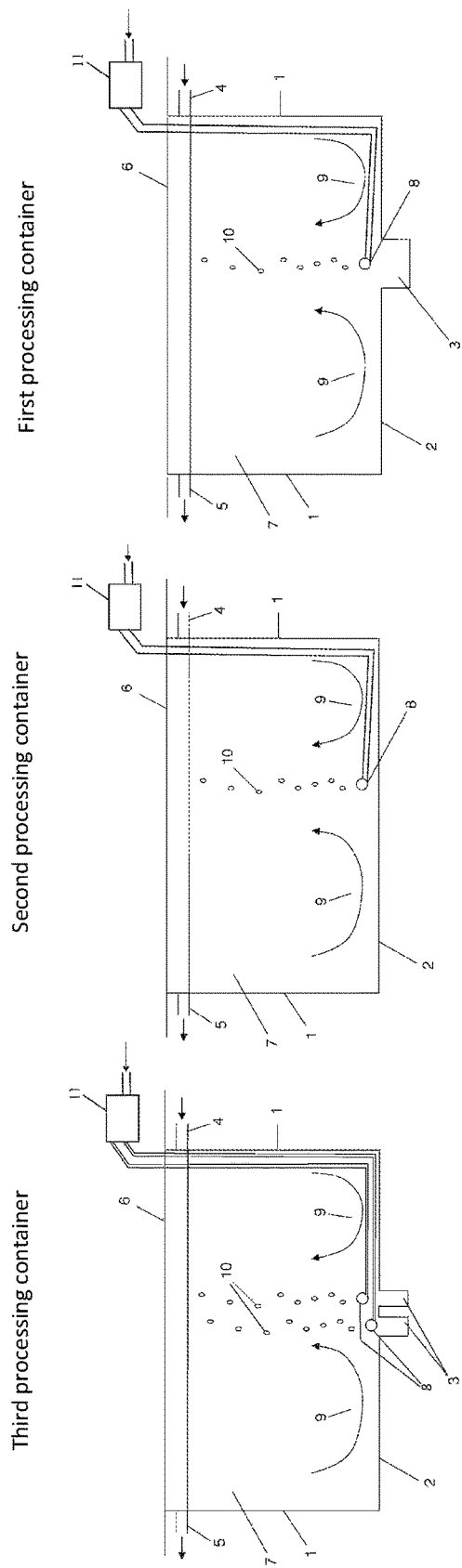
FIG. 2 shows the system in FIG. 1 with a second and a third processing container.

The system shown in Fig. 2 further provides a second processing container, or pond, to the first processing container 1. While the pond 1 serves to firstly receive untreated waste or waste water and to allow a first round of sedimentation, decomposition to take place and growth of algae, the second pond is configured to receive the treated water from the pond 1. The treated water entering the second pond is largely free of residues, worms or worms-like organism or parasites which are mostly settled in the channel 3. The second pond is configured to allow growth of other microorganisms to feed on, e.g. algae, in the treated water carried therein. As it can be understood, the first pond 1 serves to initially process the waste or waste water and specifically provides an environment for first sedimentation and decomposition and growth/generation of algae. The first pond thus serves a production centre for food growth for the microorganisms in the second pond. The first and second ponds are connected with a pipe or a water channel.

In this embodiment, the system further provides a third processing container or pond for further processing treated water exiting the second pond. In this pond, fish and shrimps are allowed to grow therein. The source of food for these fish and shrimps comes from the second pond and the microorganisms generated therein. As it can be understood, the series of ponds in the system is configured to convert waste water entering the first pond and generate purified water exiting the third pond. During purification of water, bio-energy trapped in waste products entering the first pond is passed to algae and other similar levels of microorganisms, then to fish and shrimps.

Studies leading to this invention have identified that efficiency or working of the system fluctuates in response to weather conditions. It has been identified that the efficiency of the system can be improved by controlling temperature of and light absorption by the water in at least the first pond. This can be achieved by using a cover 6. Details of the cover 6 are contained in Chinese Patent No. CN100467263C, content of which is incorporated herein in its entirety. Otherwise, the cover 6 preferably seals the surface of the pond 1 from the external atmosphere. The cover 6 serves to create an enclosed space above the water in the pond. Alternatively, the cover 6 may not seal the space above the water allowing ventilation by circulation of the ambient atmosphere. The cover 6 may be transparent or translucent and may comprise a glass panel or a sheet or film of polymeric material, for example polypropylene sheeting.

The cover 6 serves to conserve heat in the pond 1 while allowing sunlight to penetrate to the water surface, increasing the rate of growth and reproduction of phototrophic microorganisms while preventing the growth of undesirable pests or bacteria. A specific embodiment of a cover may be composed of glass having a thickness of at least 3 mm and secured to the walls of the pond on a mount by glue or other fixing means. The cover may also be composed of plastic film and its thickness will depend on the climate, but in most cases with a thickness of 0.1 mm and is sealed to the walls of the pond by suitable fixing means.

The nutrients and oxygen produced by phototrophs under strong light intensity circulate within the pool 1 along the water current 9 and so further establishes an environment for the microorganisms not to waste the nutrients and oxygen for carrying out the anaerobic metabolism but to reproduce and break down the organic waste products at a higher speed. Fats, under an aerobic condition, can be broken down to cell-building materials, e.g. FADH, NADH.

Heat trapped by the cover 6 also gives the energy required for the gases to adhere to the surface of the organic waste products, enhancing the vibration of molecules of the waste organic waste products and the structural changes of the organic waste products. Both help to break up organic waste products.

The energy needed as mentioned above, and the energy required from the warm water, can be supplemented by the energy trapped by the cover, so as to make the apparatus in this invention more energy efficient.

With heat, sunlight, electric potential energy and water current, a good circulation is established. The organic waste products will be broken up to smaller clamps and ions, which is more easy for the microorganisms to absorb, and eventually will be fully absorbed by the micro organisms.

The cover 6 when sealed also serves to prevent escape of the gas or gaseous mixture to the atmosphere.

In other embodiments, the system may be provided with a series of four ponds. For example, a fourth pond can be provided to contain largely purified water from the third pond. In preferred embodiments, the third pond may be connected to the first pond, allowing water to enter the first pond. This may be needed to control density of waste products or algae in the first pond. The description below may be applicable to embodiments which have a four-pond construction.

The second and subsequent ponds may not include a channel in the floor of the pond. Any worms or parasites may be trapped in the first pond. A cover may be provided. Gaseous inorganic nutrients may be added to the water.

Heterotrophic microorganisms carried from the first pond into the second pond by the flow of water are unable to reproduce on a large scale because of the decrease in organic material. The use of gaseous nutrients induces larger scale growth of autotrophic, for example chemolithotrophic microorganisms. A more balanced population of non-autotrophic microorganisms and autotrophic microorganisms is established in the second pond.

The third pond, similar in construction to the first pond and second pond, develops a more balanced population of non-autotrophic and autotrophic microorganisms from the water supply from the second pond. The third pond promotes production of plant species which feed on the microorganisms from the second pond and also feed on larvae of pests hatched from the water in the first and second pond. These species may include water fleas and round worms.

The fourth pond receives water from the third pond including animal species from the third pond. The fourth pond may be stocked with fish livestock. In the fourth pond the waste organic materials supplied to the first pond together with added inorganic gaseous nutrients provide food for the fish or other aquatic livestock. The water from the fourth pond may be used directly for irrigation, fish farming or for drinking water for livestock.

The third and fourth ponds need not be covered with a cover dependent on climatic conditions.

In use a pond having a capacity of 5,000 liters of water may be charged with 100 kg of livestock waste and a supply of a gaseous mixture of oxygen may be applied at a pressure selected to at least equal to provide a flow of 4 to 9/min/m$^3$. After a period of 20 to 200 hours water may be inserted through the inlet to create a flow into a second pond.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

Although various embodiments of the present invention have been described and shown, the invention is not restricted thereto, but may also be embodied in other ways within the scope of the subject-matter defined in the following claims.

What is claimed is:

1. An aerobic method for decomposition of aqueous organic waste comprising:
   providing a treatment system comprising:
   (a) at least a first processing container including sides, the container having a capacity from 100 m$^3$ to 30,000 m$^3$ and provided with an upper opening with an area from 100 m$^2$ to 20,000 m$^2$, a substantially horizontal floor with an area from 100 m$^2$ to 10,000 m$^2$ and a depth from 1 m to 3 m;
   (b) an inlet for waste or waste water to be treated in the first processing container and an outlet for water treated in the first processing container;
   (c) at least one channel arranged at the floor having an upwardly opening mouth for collecting moulds, worms or worm-like living organisms, parasites and other sediments, the channel having a width less than 0.5 m and a depth from 0.5 m to 1 m;
   (d) a ventilating pipe extending above the mouth, the ventilating pipe having a multiplicity of apertures;
   (e) a supply of a gaseous additive comprising one or more gases selected from carbon dioxide, ammonia, sulphur dioxide and hydrogen sulphide; and
   (f) a compressor and a mixing head connected to the ventilating pipe and arranged to provide a mixture of compressed air and the gaseous additive to the ventilating pipe to discharge a stream of the mixture from the apertures into the water in us; and
   the method further comprising introducing waste or wastewater to the inlet of the treatment system.

2. The method as claimed in claim 1, wherein the treatment system further comprising an adjustable cover for covering the container.

3. The method as claimed in claim 2, wherein the cover comprises a material selected from the group consisting of: plastic sheet, laminated plastic, polyolefin film, translucent glass, toughened glass or laminated glass.

4. The method as claimed in claim 1, wherein artificial pH regulating agent, calcium oxide, calcium carbonate or ammonia carbonate are not added to the first processing container.

5. The method as claimed in claim 1, further comprising supplying the system with a fertilizing agent facilitating growth of phytoplankton and zooplankton in the water for decomposing waste in the water.

6. The method as claimed in claim 1, wherein the first processing container is a pond.

7. The method as claimed in claim 1, further comprising providing a second processing container that collects water treated in the first processing container and configured to allow growth of microorganisms feeding on phytoplankton and zooplankton in the water from the first processing container.

8. The method as claimed in claim 7, further comprising providing a third processing container that collects water treated in the second processing container and configured to allow growth of fish and shrimps feeding on the microorganisms in the water from the second processing container.

9. The method as claimed in claim 1, wherein providing the system comprising providing a series of at least three processing containers.

10. The method as claimed in claim 1, further comprising providing second and third processing containers, after introducing the waste or wastewater into the inlet of the first processing container allowing the waste water to circulate within the first processing container and providing to provide an environment for growth of phytoplankton and zooplankton whereby the waste in the first processing container is decomposed naturally, allowing the phytoplankton and zooplankton containing water to pass successively into the second processing container and then the third processing container for generating purified water.

11. The method as claimed in claim 5, wherein the fertilizing agent is hydrogen sulphide.

12. The method as claimed in claim 5, wherein the zooplankton is algae.

\* \* \* \* \*